(12) United States Patent
Colson et al.

(10) Patent No.: US 9,347,455 B2
(45) Date of Patent: May 24, 2016

(54) EJECTOR ASSEMBLY

(71) Applicant: Hamilton Sundstrand Corporation, Windsor Locks, CT (US)

(72) Inventors: Darryl A. Colson, West Suffield, CT (US); Harold W. Hipsky, Willington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 676 days.

(21) Appl. No.: 13/723,663

(22) Filed: Dec. 21, 2012

(65) Prior Publication Data

US 2014/0178173 A1 Jun. 26, 2014

(51) Int. Cl.
*B64D 13/06* (2006.01)
*F04D 29/40* (2006.01)
*F04D 29/00* (2006.01)

(52) U.S. Cl.
CPC ............... *F04D 29/00* (2013.01); *B64D 13/06* (2013.01); *B64D 2013/0618* (2013.01); *Y02T 50/44* (2013.01); *Y02T 50/56* (2013.01); *Y10T 29/49826* (2015.01)

(58) Field of Classification Search
USPC ................................... 415/58.5, 58.7
See application file for complete search history.

(56) References Cited

U.S. PATENT DOCUMENTS

| | | | |
|---|---|---|---|
| 2,327,841 A * | 8/1943 | Hagen | 415/58.5 |
| 2,418,801 A * | 4/1947 | Baumann | 415/37 |
| 2,752,515 A | 6/1956 | Baudry et al. | |
| 3,763,835 A | 10/1973 | Miller et al. | |
| 4,543,785 A | 10/1985 | Patrick | |
| 5,309,735 A * | 5/1994 | Maher et al. | 62/402 |
| 5,505,587 A | 4/1996 | Ghetzler | |
| 6,434,968 B2 * | 8/2002 | Buchholz et al. | 62/401 |
| 6,926,490 B2 | 8/2005 | McAuliffe et al. | |
| 7,165,939 B2 | 1/2007 | Chen et al. | |
| 7,397,145 B2 | 7/2008 | Struve et al. | |
| 7,757,502 B2 | 7/2010 | Merritt et al. | |
| 7,952,241 B2 | 5/2011 | Kato et al. | |
| 8,313,282 B1 * | 11/2012 | Jarrah et al. | 415/62 |
| 2009/0044543 A1 * | 2/2009 | Clemen et al. | 60/785 |

OTHER PUBLICATIONS

Rosen et al., U.S. Appl. No. 13/279,576, filed Oct. 24, 2011.
Beers, U.S. Appl. No. 13/592,830, filed Aug. 23, 2012.
Chrabascz et al., U.S. Appl. No. 13/585,903, filed Aug. 15, 2012.
Colson et al., U.S. Appl. No. 13/279,588, filed Oct. 24, 2011.
Colson et al., U.S. Appl. No. 13/279,529, filed Oct. 24, 2011.
Colson et al., U.S. Appl. No. 13/279,538, filed Oct. 24, 2011.
Rosen et al., U.S. Appl. No. 13/279,488, filed Oct. 24, 2011.
Binek et al., U.S. Appl. No. 13/279,497, filed Oct. 24, 2011.
Binek et al., U.S. Appl. No. 13/279,508, filed Oct. 24, 2011.
Chrabascz et al., U.S. Appl. No. 13/279,523, filed Oct. 24, 2011.
Chrabascz et al., U.S. Appl. No. 13/279,534, filed Oct. 24, 2011.

* cited by examiner

*Primary Examiner* — Ninh H Nguyen
*Assistant Examiner* — Justin Seabe
(74) *Attorney, Agent, or Firm* — Kinney & Lange, P.A.

(57) ABSTRACT

A recirculation flow collector for a fan includes an arcuate housing; a first face with a first circular opening to receive flow; a second face with a second circular opening to allow flow in a normal fan operating condition; and an outlet in a bottom of the arcuate housing to allow recirculation flow.

19 Claims, 6 Drawing Sheets

EJECTOR ASSEMBLY

BACKGROUND

The present invention relates to an environmental control system. In particular, the invention relates to a ram air fan assembly for an environmental control system for an aircraft.

An environmental control system ("ECS") aboard an aircraft provides conditioned air to an aircraft cabin. Conditioned air is air at a temperature, pressure, and humidity desirable for aircraft passenger comfort and safety. At or near ground level, the ambient air temperature and/or humidity is often sufficiently high that the air must be cooled as part of the conditioning process before being delivered to the aircraft cabin. At flight altitude, ambient air is often far cooler than desired, but at such a low pressure that it must be compressed to an acceptable pressure as part of the conditioning process. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it. Under conditions where the aircraft is moving fast enough, the pressure of air ramming into the aircraft is sufficient to move enough air through the ECS and over the heat exchangers to remove the excess heat.

While ram air works well under normal flight conditions, at lower flight speeds, or when the aircraft is on the ground, ram air pressure is too low to provide enough air flow across the heat exchangers for sufficient heat removal from the ECS. Under these conditions, a fan within the ECS is employed to provide the necessary airflow across the ECS heat exchangers. This fan is called a ram air fan.

As with any system aboard an aircraft, there is great value in an improved ram air fan that includes innovative components designed to improve the operational efficiency of the ram air fan or to reduce its weight.

SUMMARY

A recirculation flow collector for a fan includes an arcuate housing; a first face with a first circular opening to receive flow; a second face with a second circular opening to allow flow in a normal fan operating condition; and an outlet in a bottom of the arcuate housing to allow recirculation flow.

A method of operating a ram air fan in a recirculation condition includes collecting air coming from the fan in a recirculation flow collector; directing the air coming from the fan through an outlet in one side of a recirculation flow collector; and directing the air coming out of the outlet back to an inlet of the fan.

DETAILED DESCRIPTION

Figure 1A:
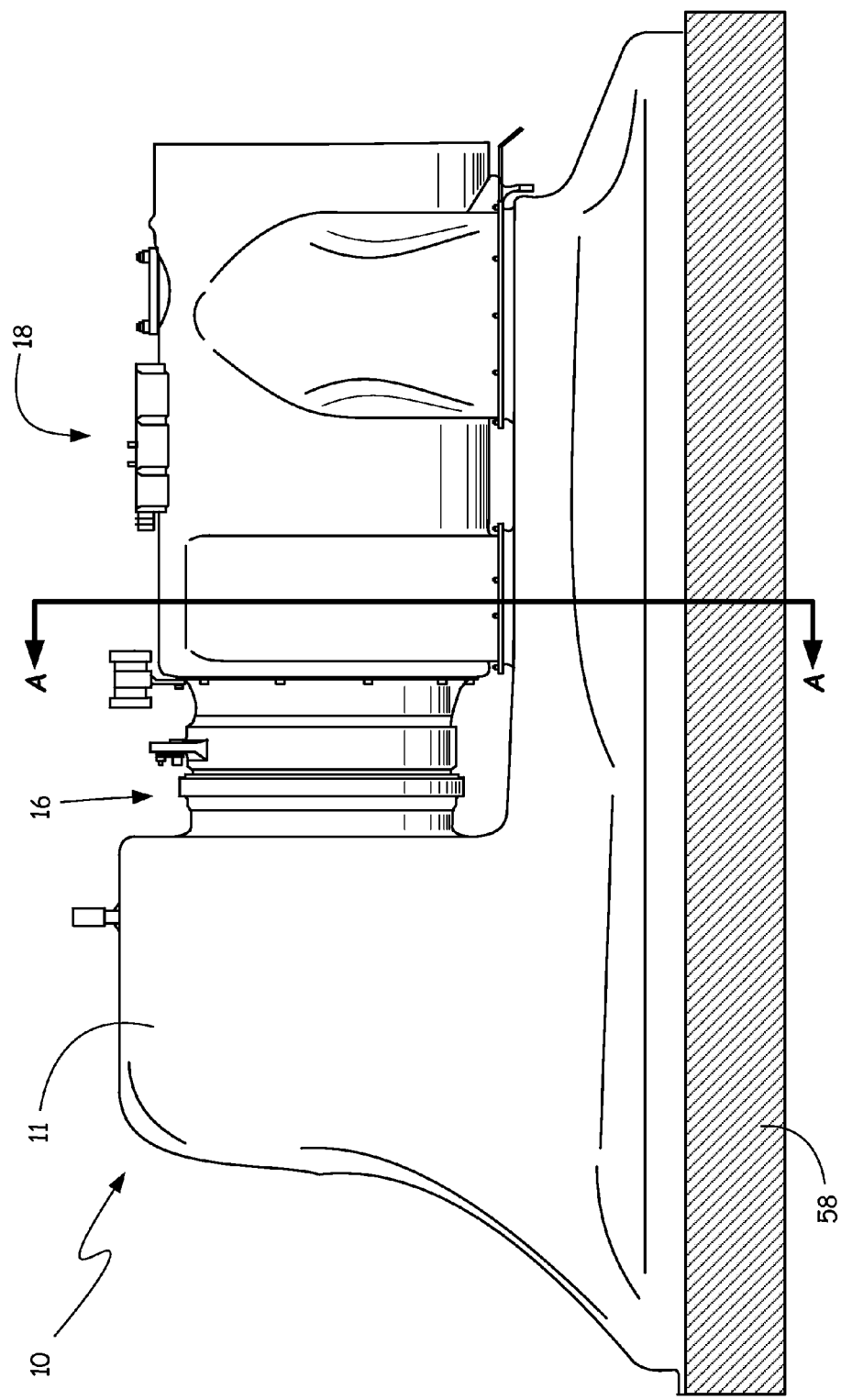
FIG. 1A is a side view of a ram air fan assembly.
Figure 1B:
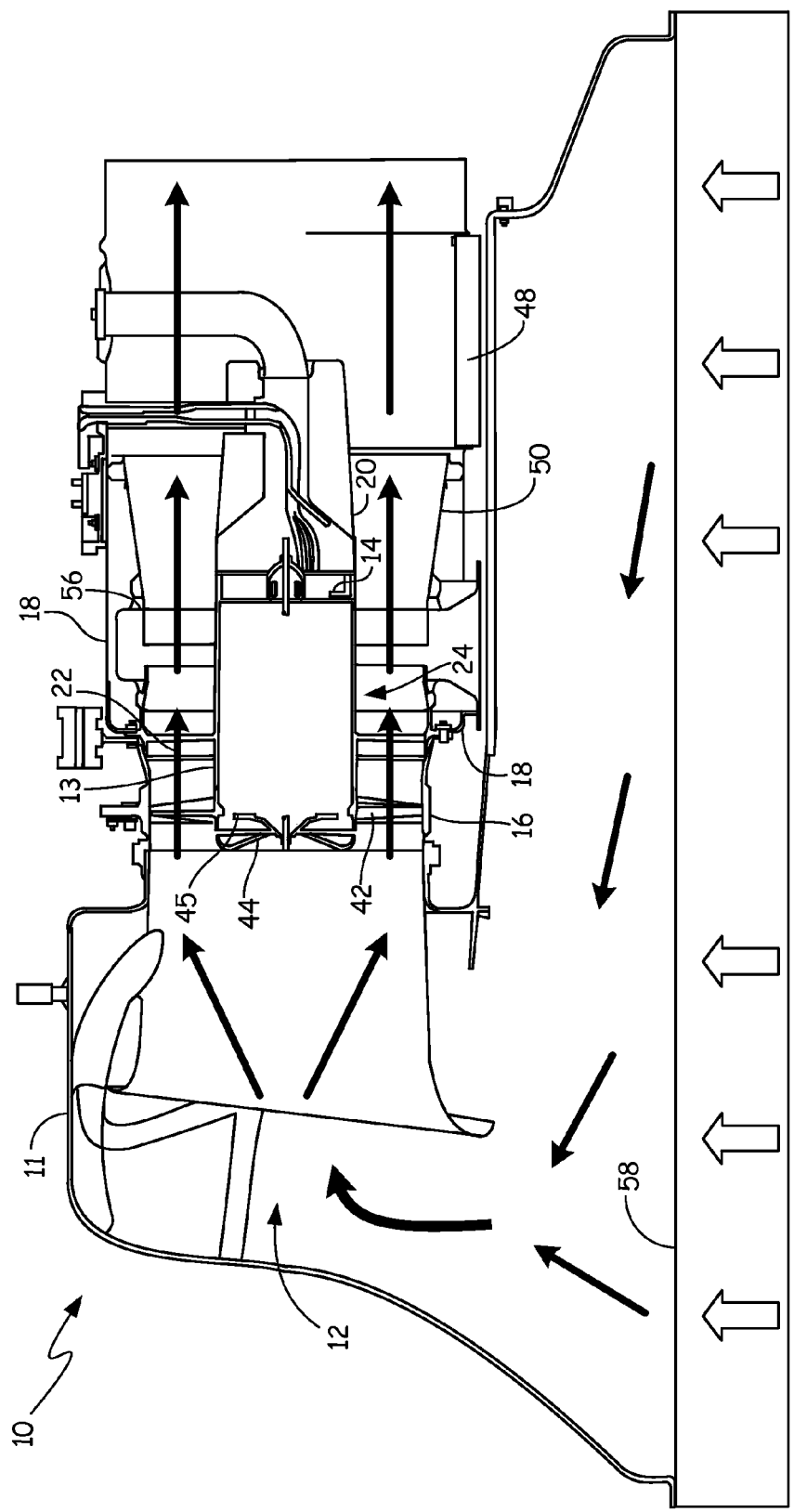
FIG. 1B is a cross-sectional view of the ram air fan assembly of FIG. 1A showing flow during normal operation.

FIG. 1A illustrates a side view of an electrically driven ram air fan assembly 10. FIG. 1B shows a cross-sectional view of ram air fan assembly 10, showing flow during normal operation, and FIG. 1C shows a cross-sectional view of ram air fan assembly 10, showing flow during a recirculation condition.

Ram air fan assembly 10 includes flow path housing 11, fan inlet 12, fan housing 13, bearing housing 14, inlet housing 16, outer housing 18 and inner housing 20. Fan housing 13 includes fan struts 22 and motor 24. Inlet housing 16 contains fan rotor 42, shroud 44, and hub 45. Outer housing 18 includes check valve 48. Within outer housing 18 is diffuser 50 and recirculation flow collector 56. Below ram air fan sits heat exchanger 58. Flow path housing 11 is also shown.

Figure 1C:
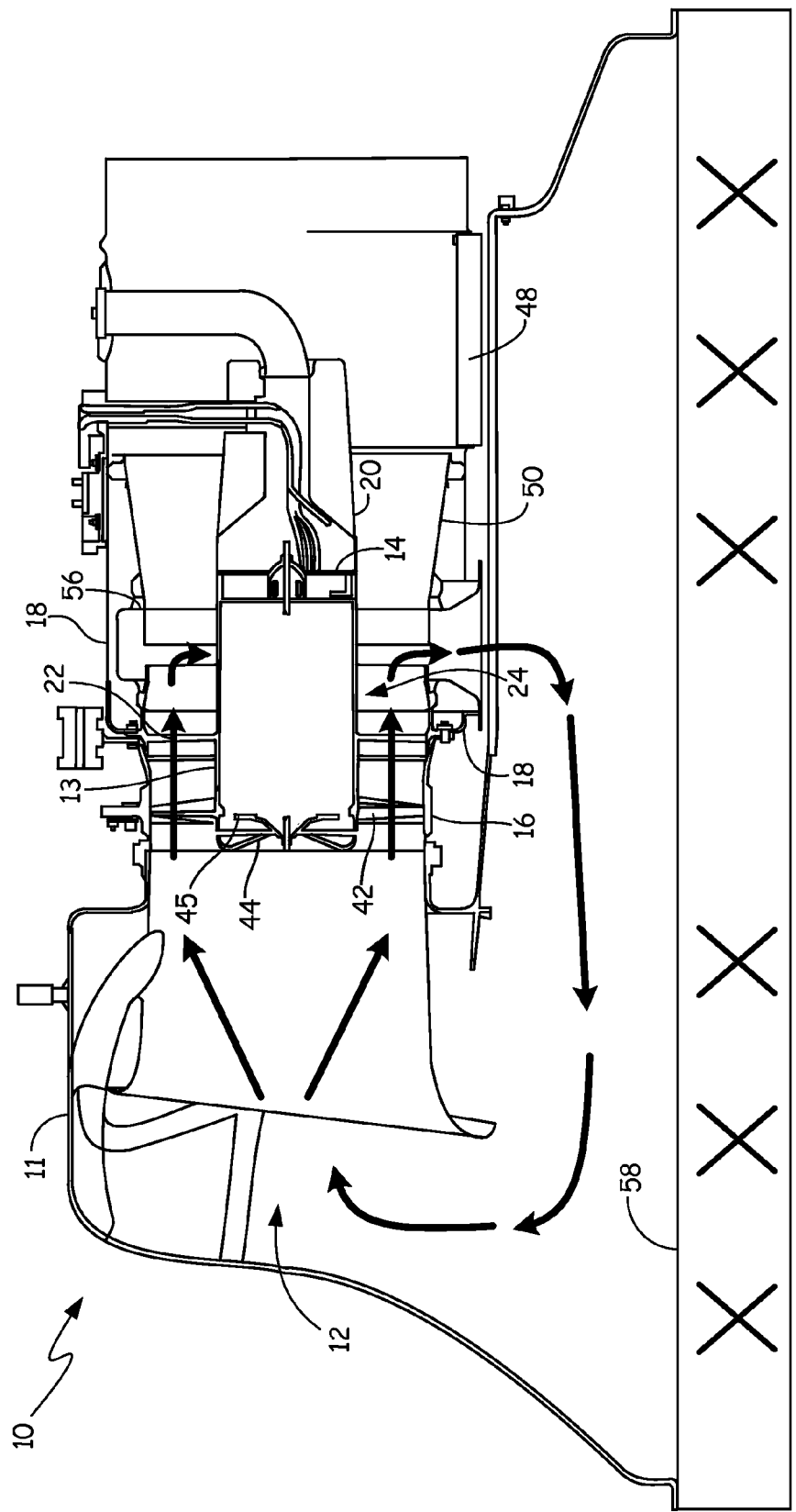
FIG. 1C is a cross-sectional view of the ram air fan assembly of FIG. 1A showing recirculation flow.

As illustrated in FIGS. 1B-1C, inlet housing 16 and outer housing 18 are attached to fan housing 13 at fan struts 22. Bearing housing 14 is attached to fan housing 13. Motor 24 attaches to fan housing 13. Fan rotor 42 is attached to motor 24. Hub 45, shroud 44, fan rotor 42, and a portion of fan housing 13 are contained within inlet housing 16. Diffuser 50 is attached to recirculation flow collector 56, which connects to outer housing 18. Check valve 48 is a portion of outer housing 18 that connects ram air fan assembly 10 to the bypass inlet. Inlet housing 16 is connected to fan inlet 12 and outer housing 18 is connected to the fan outlet.

In normal operation, ram air fan assembly 10 is installed into an environmental control system aboard an aircraft and connected to the fan inlet 12, the bypass inlet, and the fan outlet. When the aircraft does not move fast enough to generate sufficient ram air pressure to meet the cooling needs of the ECS, power is supplied to motor 24, which causes fan rotor 42 to rotate, pulling air in from heat exchanger 58 to fan inlet 12 to enter the fan in the axial direction. The air then travels through inlet housing 16, past fan struts 22 and into the space between fan housing 13 and outer housing 18, increasing the air pressure in outer housing 18. As the air moves through outer housing 18, it flows past diffuser 50 and inner housing 20, where the air pressure is increased due to the shape of diffuser 50 and the shape of inner housing 20. Once past inner housing 20, the air moves out of the fan outlet.

FIG. 1C shows a cross-sectional view of the ram air fan 10 in a recirculation flow condition. In some conditions, ram air flow can be blocked at various points. This can include heat exchanger 58 blockage, for example through contamination from outside air, dirt, sand or outside objects sucked in, such as a plastic bag. Other blockage can occur from ram air doors malfunctioning and/or being near or fully closed at times when they shouldn't. This blockage causes fan 10 to operate at lower flows and can cause instability. If fan 10 continues to operate when the flow path is blocked, fan 10 could go into a surge condition, which could cause structural failures, such as fan blade 42 breakage, due to high cycle fatigue.

By including recirculation flow collector 56 within outer housing 18 to collect flow and provide a recirculation flow path during a fan recirculation condition, fan 10 can avoid becoming unstable when a normal air source is blocked. Recirculation flow collector 56 and outer housing 18 collect flow from fan during a recirculation condition due to the structure of recirculation flow collector 56 and outer housing 18 combined with the higher pressure air coming from the fan. Recirculation flow collector 56 and outer housing 18 direct the collected air coming from outer housing 18 to an outlet on one side of outer housing 18 and flow collector 56. From the outlet, a flow path back to fan inlet 12 provides fan with a steady stream of air to keep fan 10 from reaching an instability condition. Once blockage has been removed within fan assembly 10, the lower pressure of air coming from fan will cause flow to stop flowing in the recirculation pattern shown in FIG. 1C, and will flow in normal conditions shown in FIG. 1B.

Figure 2A:
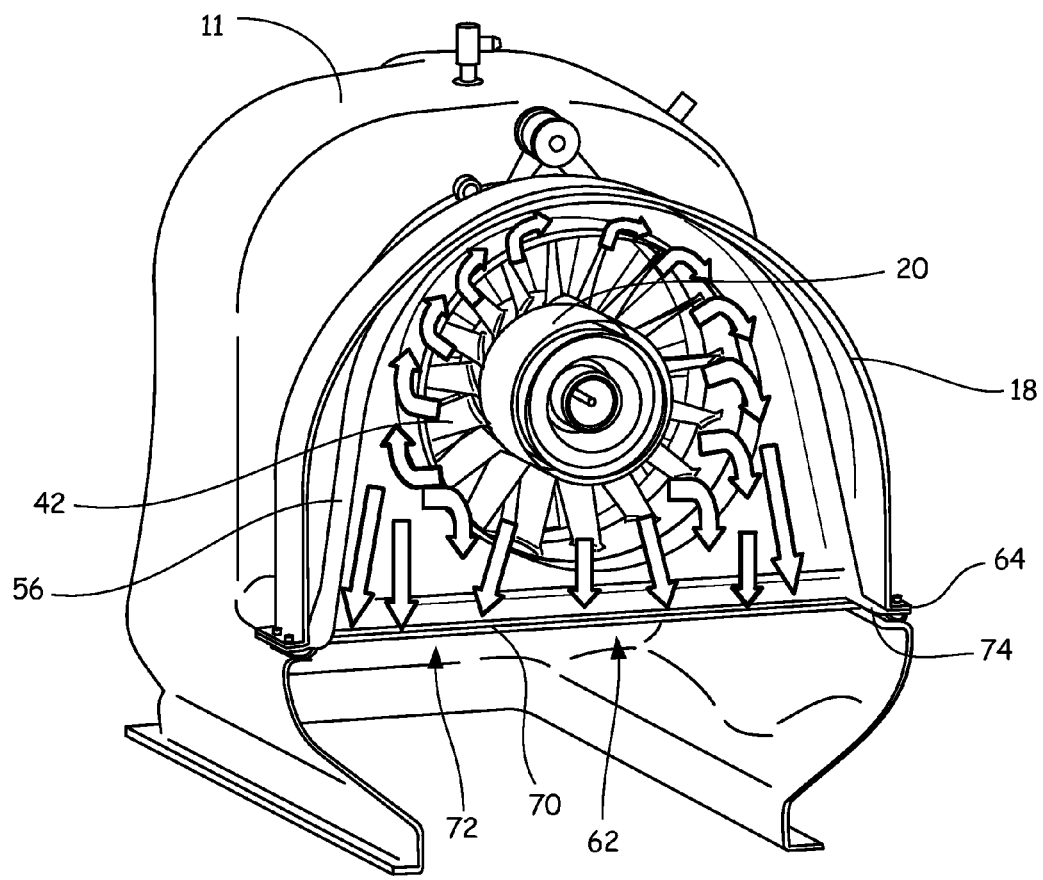
FIG. 2A is a cross-sectional view of FIG. 1A at section A-A with flow arrows showing flow in a recirculation condition.
Figure 2B:
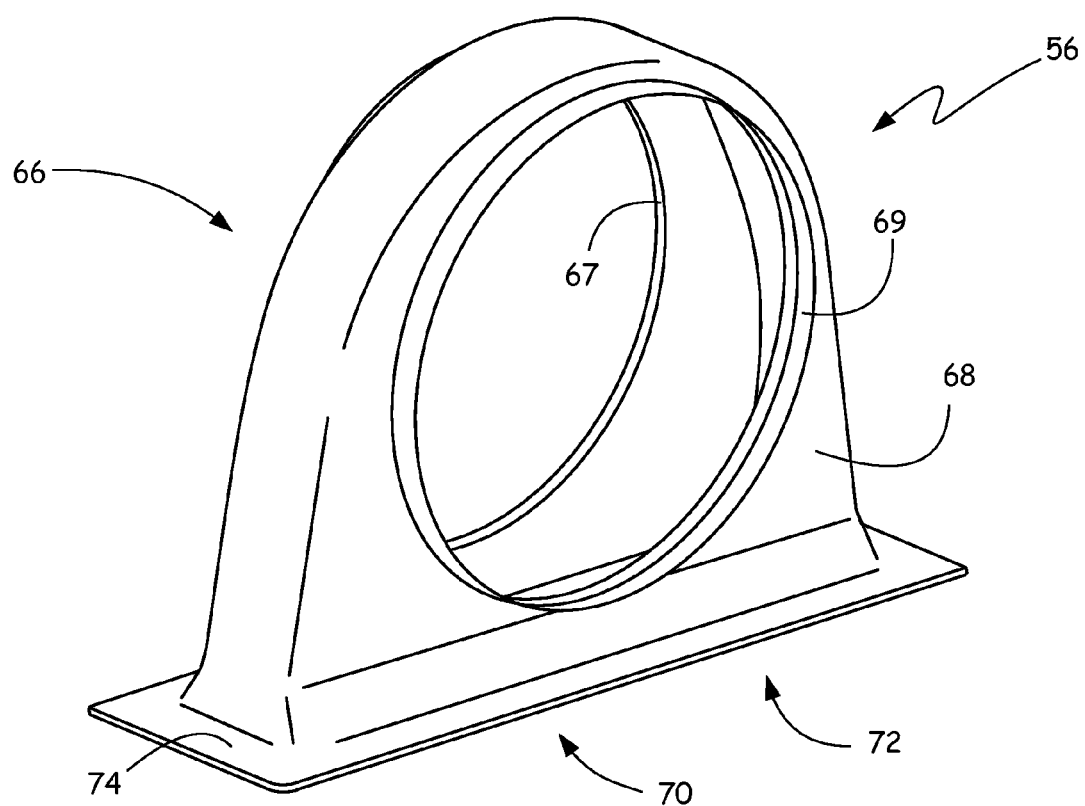
FIG. 2B is a perspective view of a recirculation flow collector.
Figure 2C:
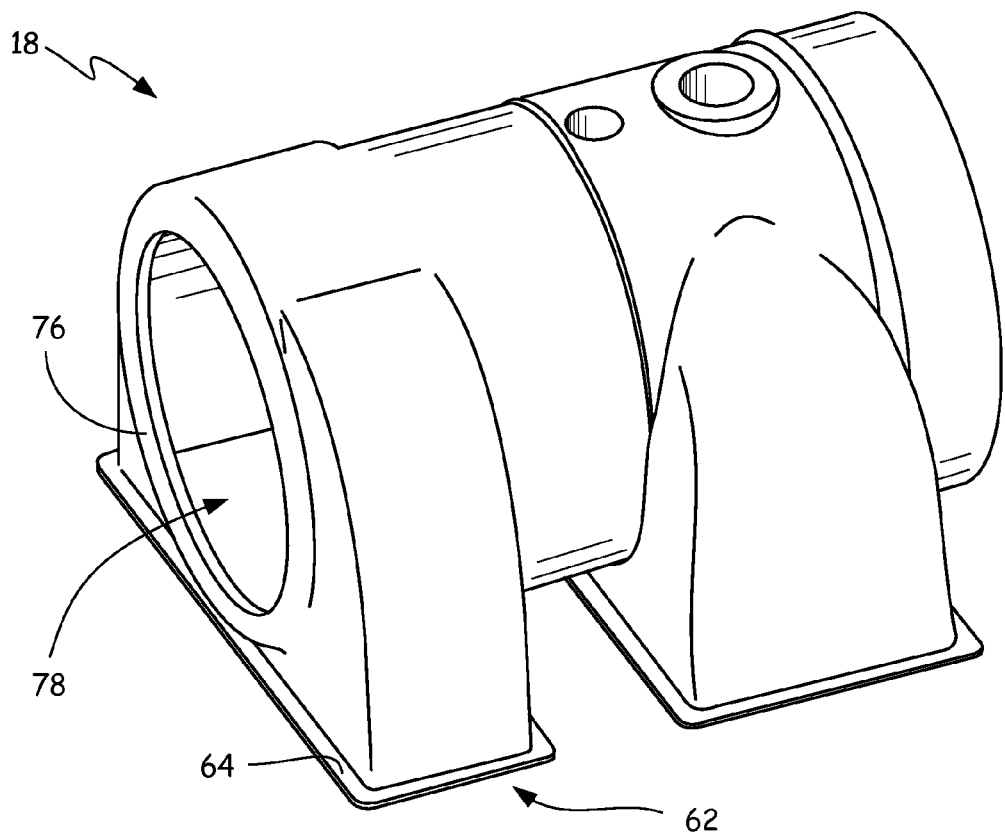
FIG. 2C is a perspective view of an outer housing.

FIG. 2A shows a cross-sectional view of FIG. 1A at section A-A with flow arrows showing flow in a recirculation condition. FIG. 2B shows a perspective view of recirculation flow collector 56, and FIG. 2C shows a perspective view of outer housing 18. FIGS. 2A-2C include flow path housing 11, inlet housing 16, outer housing 18, inner housing 20 and fan rotors 42. Outer housing 18 includes recirculation exit or outlet 62 with lip 64. Recirculation flow collector 56 includes first face 66 with first opening 67, second face 68 with second opening 69, bottom 70 with outlet 72 and lip 74.

Recirculation flow collector 56 is arcuate in shape with first face 66 with a circular opening 67, a second face 68 with a circular opening 69 and a bottom 70. Bottom 70 consists of rectangular shaped outlet 72 with lip 74 surrounding outlet 72. First face 66 and second face 68 flare outward at a location close to bottom 70. Recirculation flow collector 56 could be a carbon fiber composite. Alternatively, recirculation flow collector 56 may be metallic (including alloys), for example, aluminum, and can be cast and/or machined into shape.

Outer housing 18 includes front face 76 with circular inlet 78 and outlet 62 on one side of housing 18. Outer housing 18 can be carbon fiber composite, or alternatively metallic (including alloys).

Recirculation flow collector 56 is inserted into and fits inside outer housing 18 so that outlet 72 of collector 56 aligns with outlet 62 of outer housing 18 and first face 66 opening 67 aligns with outer housing 18 inlet 78. Lip 64 of outer housing 18 and lip 74 of recirculation flow collector 56 bolt to flow path housing 11 to secure outer housing 18 and recirculation flow collector 56 together.

Inlet 78 on front face 76 of outer housing 18 receives air flow. In normal fan operating condition the pressure of flow causes the air to continue axially through outer housing 18, as shown in FIG. 1B. In a recirculation condition (FIG. 1C), the air coming from fan is collected in recirculation collector 56. This collection is due to shape of recirculation collector and due to the higher pressure of air coming from fan in a recirculation condition due to a lack of incoming air through heat exchanger 58. This collected air is then directed toward bottom 70 of recirculation collector 56, and through outlet 72 of recirculation collector 56 and outlet 62 of outer housing 18. This air is then directed back toward fan inlet 12, as shown in FIG. 1B to ensure fan is aerodynamically stable even when heat exchanger 58 is blocked.

By providing recirculation collector 56 and outer housing 18 with outlets 72, 62 on one side, electric ram air fan 10 is able to have a recirculation flowpath on only one side back to inlet 11, preventing fan 10 structural failure due to a blocked normal flow path. Prior art systems sometimes included a recirculation flowpath which exited the fan in all directions circumferentially to flow back to inlet. These system required more space to allow recirculation airflow in all directions. Outer housing 18 and recirculation collector 56 with outlets 62, 72 on only one side allow for a smooth recirculation flow path that is smaller than past ejector flow path components. This can allow ram air fan 10 to have a smaller overall size, needing less space and contributing less weight on aircraft. Additionally, the shape and design of recirculation collector 56 and outer housing 18 allow for easier installation in current aircraft models.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A recirculation flow collector for a fan, the collector comprising:
    an arcuate housing;
    a first face with a first circular opening to receive flow from the fan;
    a second face with a second circular opening to allow flow in a normal operating condition of the fan; and
    an outlet in a bottom of the arcuate housing in fluid communication with a recirculation path extending between the outlet and the first circular opening to allow recirculation flow therethrough in a blocked operating condition of the fan, wherein the arcuate housing is configured such that recirculation flow is directed circumferentially around the arcuate housing towards the outlet in the blocked operating condition.

2. The collector of claim 1, wherein the bottom comprises: a rectangular outlet.

3. The collector of claim 2, wherein the bottom further comprises:
    a lip around the rectangular outlet to connect the collector to an outer housing.

4. The collector of claim 3, wherein the lip connects to each of the first face and the second face with a portion of the first face and the second face that angles outward toward the lip.

5. The collector of claim 1, wherein the first face has a lip extending outward around the first opening.

6. The collector of claim 1, wherein the second face has a lip extending outward around the second opening.

7. A ram air fan ejector assembly comprising:
    an outer housing with a recirculation exit on one side; and
    a recirculation flow collector with an outlet on one side which sits inside the outer housing and directs flow through the recirculation exit to the outlet in a fan recirculation condition, wherein the outlet of the recirculation flow collector abuts the recirculation exit.

8. The ram air fan ejector assembly of claim 7, wherein the recirculation flow collector comprises:
    an arcuate housing;
    a first face with a first circular opening to receive flow;
    a second face with a second circular opening to allow flow in a normal fan operating condition; and
    a bottom with the outlet; and
    a lip around the outlet to connect the collector to the outer housing.

9. The ram air fan ejector assembly of claim 8, wherein the bottom with the outlet is rectangular.

10. The ram air fan ejector assembly of claim 8, wherein each of the first face and the second face have lips extending axially outwards around the first circular opening and the second circular opening.

11. A ram air fan comprising:
a fan housing;
a fan motor attached to the fan housing;
a fan rotor;
a thrust shaft connecting the fan motor to the fan rotor;
an outer housing attached to the fan housing with a recirculation exit on one side; and
a recirculation flow collector with an outlet on one side, the collector secured inside the outer housing so that the recirculation exit and the outlet align to direct flow through the recirculation exit and the outlet in a recirculation condition.

12. The ram air fan of claim 11, and further comprising:
a heat exchanger in fluid communication with the ram air fan.

13. The ram air fan of claim 12, wherein the heat exchanger sends fluid into the ram air fan in normal operating condition.

14. The ram air fan of claim 11, wherein the recirculation flow collector comprises:
an arcuate housing;
a first face with a first circular opening to receive flow;
a second face with a second circular opening to allow flow in a normal fan operating condition; and
a bottom with the outlet; and
a lip around the outlet to connect the collector to the outer housing.

15. A method of operating a ram air fan in a recirculation condition, the method comprising:
collecting air coming from the fan in a recirculation flow collector, wherein at least a partial blockage of the air entering the fan causes the air coming from the fan to collect in the recirculation flow collector;
directing the air coming from the fan circumferentially around an outer periphery of the recirculation flow collector and through an outlet in one side of the recirculation flow collector; and
directing the air coming out of the outlet back to an inlet of the fan.

16. The method of claim 15, wherein the step of directing the air coming out of the outlet back to the inlet of the fan is performed by using a heat exchanger and a flow path housing to form a flow path to the entrance of the fan.

17. The method of claim 15, wherein the recirculation flow collector used to perform the step of collecting air coming from the fan fits into an outer housing and is shaped to collect flow during a recirculation condition.

18. A method of installing a ram air fan ejector assembly, the method comprising:
inserting a recirculation flow collector for a fan into an outer housing so that an outlet on one side of the collector aligns with a recirculation exit in the outer housing, the recirculation flow collector having an arcuate housing configured to circumferentially direct air collected therein along the recirculation flow collector to the outlet in a blocked flow condition of the fan; and
connecting a first circular opening of the recirculation flow collector to a downstream side of the fan, wherein the recirculation exit is disposed on the upstream side of the fan;
connecting a second circular opening of the recirculation flow collector to the flow path housing, wherein the first and second circular openings are positioned along a common axis or parallel axes and the outlet is positioned between the first and second circular openings; and
securing the collector and outer housing to a flow path housing.

19. The method of claim 18, wherein the step of securing the collector and outer housing to a flow path housing is done by bolting.

\* \* \* \* \*